United States Patent
Kimoto

(10) Patent No.: US 7,312,889 B2
(45) Date of Patent: Dec. 25, 2007

(54) FACSIMILE MACHINE AND TRANSMISSION METHOD OF SCANNED IMAGE

(75) Inventor: Osamu Kimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1004 days.

(21) Appl. No.: 10/440,670

(22) Filed: May 19, 2003

(65) Prior Publication Data

US 2003/0214673 A1 Nov. 20, 2003

(30) Foreign Application Priority Data

May 20, 2002 (JP) .............................. 2002-144681

(51) Int. Cl.
  *G06F 15/00* (2006.01)
  *H04N 1/32* (2006.01)
  *G06K 9/32* (2006.01)

(52) U.S. Cl. ...................... 358/1.15; 358/442; 382/297

(58) Field of Classification Search ............... 358/1.15, 358/400, 442, 402, 468, 449, 451, 462, 474, 358/488, 498; 382/297, 296, 295
See application file for complete search history.

(56) References Cited

U.S. PATENT DOCUMENTS

| | | | |
|---|---|---|---|
| 6,215,858 B1 * | 4/2001 | Bartholomew et al. | 379/88.17 |
| 6,301,397 B1 * | 10/2001 | Jankowski et al. | 382/296 |
| 6,396,848 B1 * | 5/2002 | Ohta | 370/490 |
| 6,470,098 B2 * | 10/2002 | Yamaguchi et al. | 382/284 |
| 6,981,209 B1 * | 12/2005 | Parikh et al. | 715/509 |
| 7,146,053 B1 * | 12/2006 | Rijavec et al. | 382/233 |
| 7,164,492 B2 * | 1/2007 | Quach | 358/1.18 |
| 2002/0054335 A1 * | 5/2002 | Sekiguchi | 358/1.15 |
| 2002/0181004 A1 * | 12/2002 | Morita | 358/1.13 |
| 2003/0115326 A1 * | 6/2003 | Verma et al. | 709/225 |
| 2004/0141207 A1 * | 7/2004 | Warmus et al. | 358/1.18 |
| 2004/0181749 A1 * | 9/2004 | Chellapilla et al. | 715/505 |

FOREIGN PATENT DOCUMENTS

| | | |
|---|---|---|
| JP | 05-244395 | 9/1993 |
| JP | 06-245053 | 9/1994 |
| JP | 08-228279 | 9/1996 |
| JP | 2001-238064 | 8/2001 |

* cited by examiner

Primary Examiner—Madeleine AV Nguyen
(74) Attorney, Agent, or Firm—Hogan & Hartson LLP

(57) ABSTRACT

A facsimile machine includes a facsimile communication unit, an Internet facsimile communication unit, and a controller that sets to rotate a scanned image by 90 degrees. When the controller sets to rotate the scanned image by 90 degrees, the facsimile communication unit rotates the scanned image by 90 degrees and transmits the scanned image, and the Internet facsimile communication unit transmits the scanned image without rotating the scanned image by 90 degrees.

20 Claims, 5 Drawing Sheets

FACSIMILE MACHINE AND TRANSMISSION METHOD OF SCANNED IMAGE

BACKGROUND OF THE INVENTION

1. Field of the Invention

The present invention relates to a facsimile machine such as an Internet facsimile machine, and to a transmission method for transmitting images scanned by the facsimile machine.

2. Description of the Related Art

The Internet facsimile machine can transmit and receive Internet facsimiles using an electronic mail format. The Internet facsimile machine can also transmit or receive G3 facsimiles. The Internet facsimile machine scans original images, and transmits the scanned images as G3 facsimile data or the like, or as an attached file of an electronic mail. In such a facsimile machine, when scanning and transmitting the original image, if a paper width in a first scanned direction is the width of the short side of a piece of A4 paper, the facsimile machine is generally set to rotate the paper width by 90 degrees at transmission, and to transmit the original document as a landscape original which has a width of A3 sized paper, and which the image is longer widthwise than lengthwise.

SUMMARY OF THE INVENTION

An advantage of the present invention is to reduce the communication time for a facsimile transmission, and to transmit images in easily viewable form for an electronic mail transmission.

A facsimile machine of the present invention includes a facsimile communication unit, and an Internet facsimile communication unit. In addition, the facsimile machine includes a setting unit which sets to transmit a scanned image by rotating the image by 90 degrees. When there is a setting set by the setting unit, the facsimile communication unit transmits the scanned image by rotating the image by 90 degrees. In addition, the Internet facsimile communication unit transmits the scanned image without rotating the image by 90 degrees regardless of the setting. When the short side of the scanned original is in a first scan direction, it is preferable for the facsimile communication unit to rotate the scanned image by 90 degrees.

A transmission method of the scanned image of the present invention is used in the facsimile machine which includes an image scanning unit, a facsimile communication unit, and an Internet facsimile communication unit. The transmission method includes accepting a setting to transmit the scanned image by rotating the image by 90 degrees. In addition, the transmission method includes transmitting the scanned image by rotating the image by 90 degrees in case of the facsimile transmission and when the short side of the scanned original is in the first scan direction. The transmission method includes transmitting the scanned image without rotating the image regardless of the setting of the Internet facsimile transmission.

According to the present invention, even when the setting of the facsimile machine is to transmit facsimile data by rotating the facsimile data by 90 degrees, in the case of the transmission using the electronic mail format, the scanned image can be transmitted using the same format without being rotated. Therefore, in the case of the facsimile, a communication time and a communication expense can be saved. In addition, in the case of the electronic mail, the received data is easily viewable and convenient for a recipient. Moreover, when the paper width in the first scan direction is the short side, by rotating the facsimile data 90 degrees at the facsimile transmission, an output side can output the data from a long side of the output paper. As a result, the recipient can receive and output the data within a short period of time, and it is convenient for the recipient.

DETAILED DESCRIPTION OF THE PREFERRED EMBODIMENTS

Figure 1:
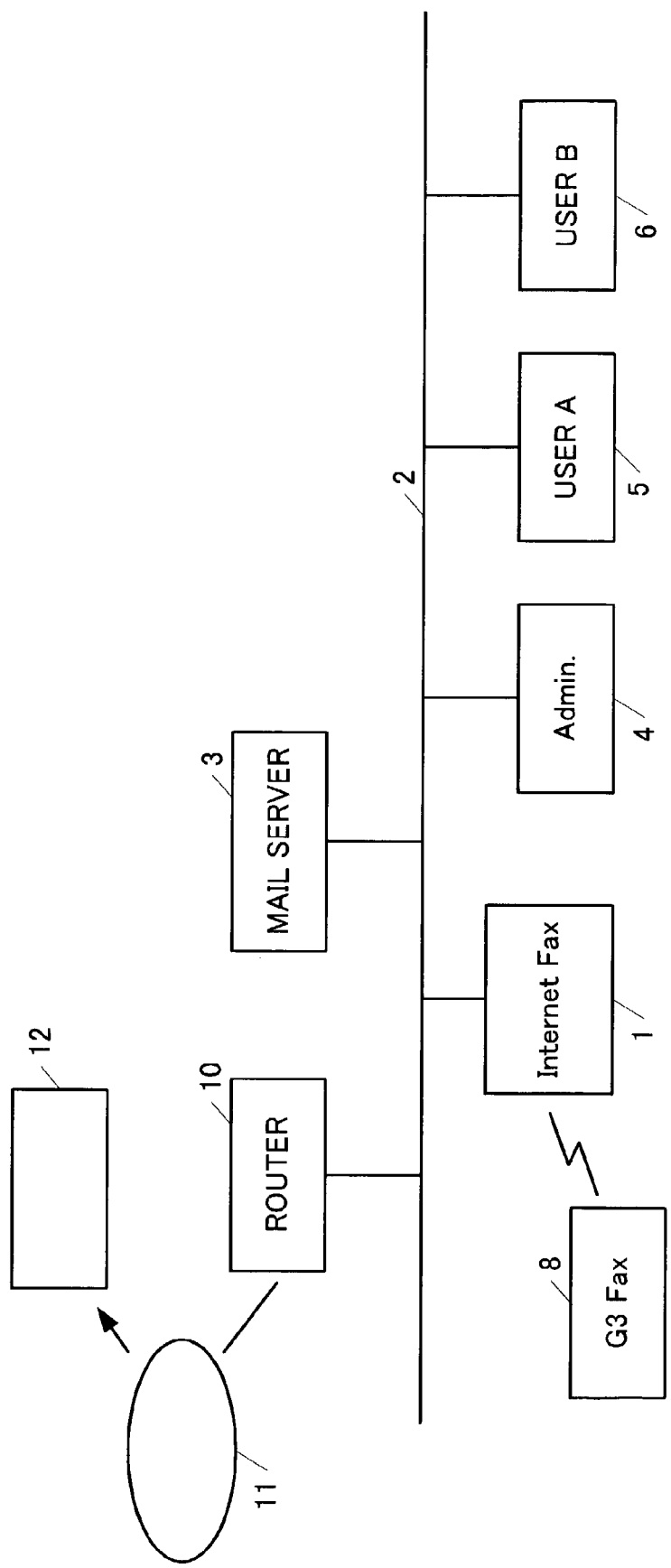
FIG. 1 illustrates an environment where the Internet facsimile machine of an embodiment is used.

FIG. 1 through FIG. 5 illustrate an embodiment of the present invention. FIG. 1 illustrates an environment where an Internet facsimile machine 1 of the embodiment is used. Reference number 2 is a Local Area Network (LAN), and 3 is a mail server. In the drawing, the mail server 3 is shown as a separate machine from the Internet facsimile machine 1. However, the Internet facsimile machine 1 can serve as the mail server 3. Reference numbers 4 through 6 are communication terminals such as personal computers. Specifically, the communication terminals are a communication terminal of an administrator of the LAN 2, or the communication terminal of a general user.

The Internet facsimile machine 1 is connected to a G3 facsimile machine 8 via a public switched telephone network or the like. In addition, the Internet facsimile machine 1 is connected to the Internet 11 via a router 10. The G3 facsimile machine 8 is an example of a conventional facsimile machine, and can be a G4 facsimile machine or the like. A communication terminal 12 is the communication terminal which is connected to the Internet 11, and which is a destination of a transmission from the Internet facsimile machine 1. As described above, the Internet facsimile machine 1 carries out a transmission and a reception of the Internet facsimile by using an electronic mail. In addition, the Internet facsimile machine 1 is connected to the G3 facsimile machine or the like via the public switched telephone network.

Figure 2:
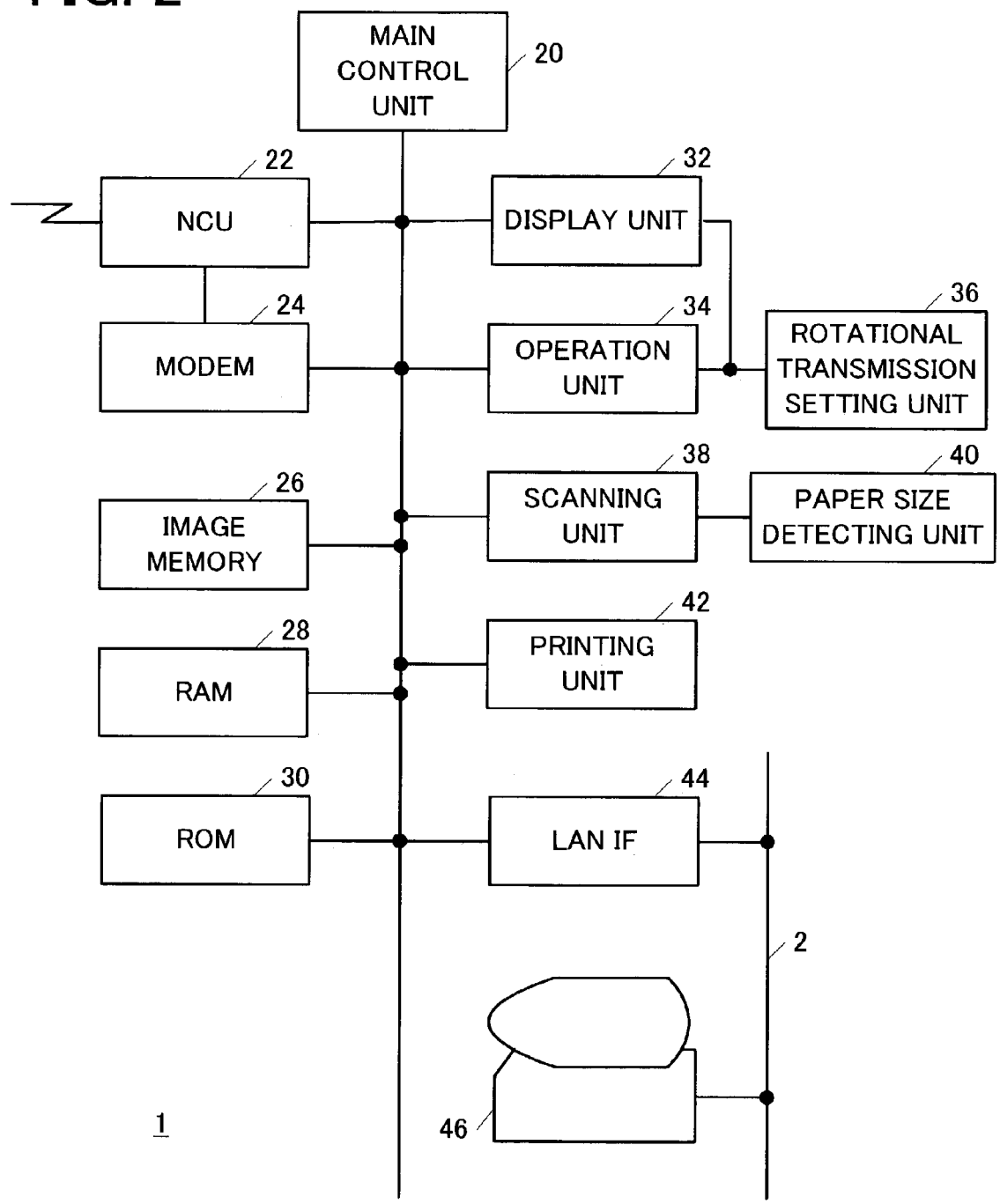
FIG. 2 is a block diagram showing a configuration of the Internet facsimile machine of the embodiment.

FIG. 2 shows a configuration of the Internet facsimile machine 1. In the drawing, reference number 20 is a main control unit, 22 is a network control unit (NCU), and 24 is a modem. The NCU 22 establishes a connection with the public switched telephone network or the like, and the modem 24 carries out a communication for the facsimile transmission and reception. An image memory 26 stores facsimile data or the like as image data. A Random Access Memory (RAM) 28 stores data or the like in a working state. A Read Only Memory (ROM) 30 stores control program or the like.

A display unit 32 carries out display to the user by a Light Emitting Diode (LED), a Liquid Crystal Display (LCD) or the like. From an operation unit 34, the user inputs a destination address or the like such as an electronic mail address or a facsimile number from a keyboard or the like.

In addition, from the operation unit 34, the user carries out an instruction for operation by a touch panel on the LCD. A rotational transmission setting unit 36 is a unit for setting to carry out the facsimile transmission by rotating the original image by 90 degrees from the touch panel or the like on the LCD. Normally, the 90 degree rotation and the transmission of the scanned original is set to ON. A scanning unit 38 scans the original image and reads image data. A paper size detecting unit 40 detects the paper size when reading the original image. A printing unit 42 prints the received image or the image read by the scanning unit 38 onto a recording paper.

Reference number 44 is a LAN interface, and the Internet facsimile communication is carried out under an electronic mail format or the like by using the LAN interface 44. The Internet facsimile machine 1 is connected to the personal computers 4~6 of FIG. 1 or various terminals 46 or the like via the LAN 2. The Internet facsimile machine 1 also functions as a network scanner or a network printer. For this reason, the Internet facsimile machine 1 works as a facsimile machine or a copy machine, and also functions as a network printer or a network scanner.

Figure 3:
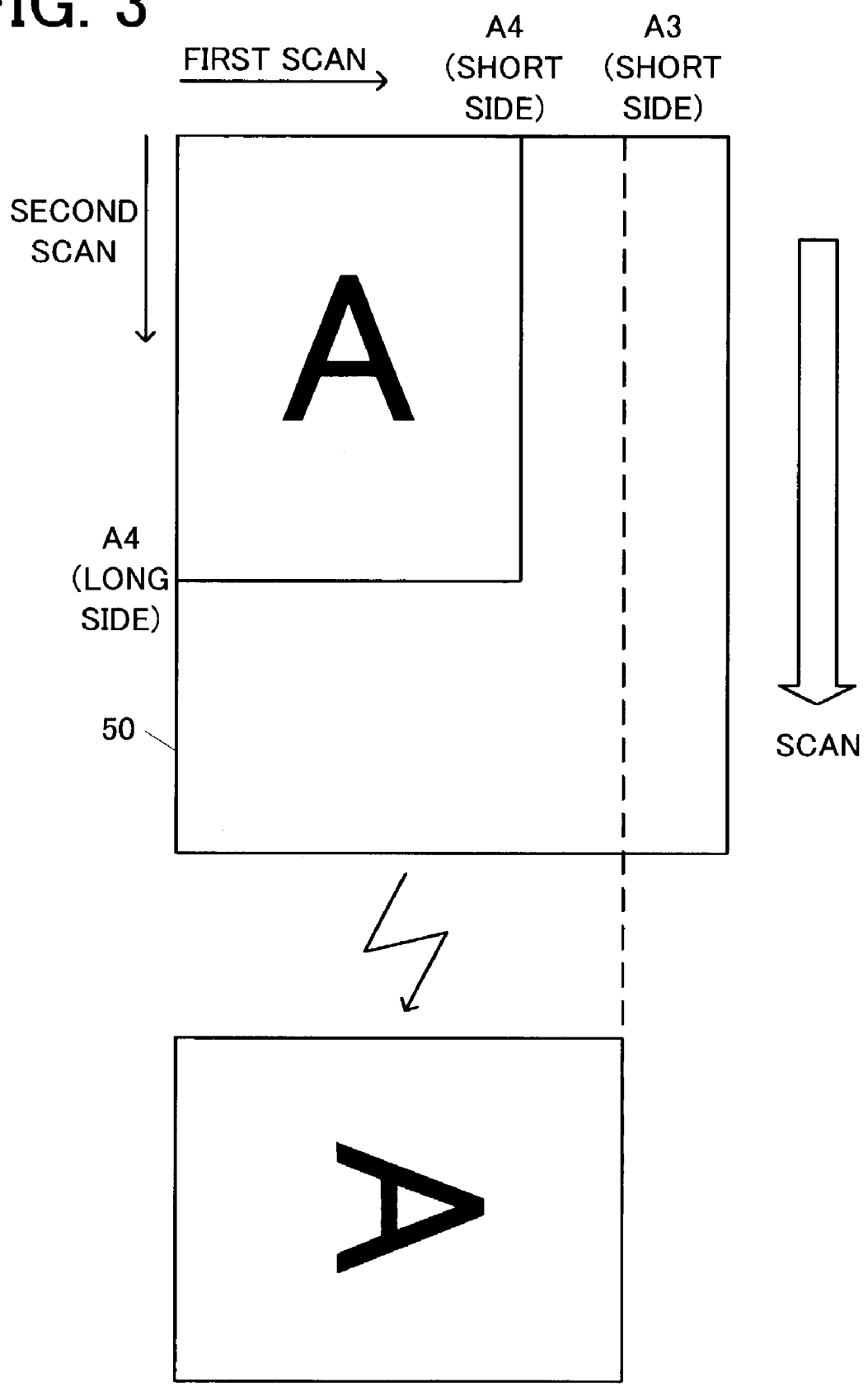
FIG. 3 illustrates original image and transmission image of when transmitting scanned image by a facsimile.

FIG. 3 shows an example of the scanning of an original image at the Internet facsimile machine 1, and transmitting the image when carrying out the facsimile transmission. For example, the G3 facsimile machine 8 of FIG. 1 is a receiving device. The rotation of the scanned image is set at the Internet facsimile machine 1. At scanning, when the short side of the A4 sized paper on a platen glass 50 is in the first scan direction, the direction of the paper is rotated by 90 degrees when outputting. Then, the original is transmitted as a landscape image which the first scan direction is the short side of A3 sized paper and the second scan direction is the short side of A4 sized paper, and the receiving device outputs the image as a landscape image having a size of A4 sized paper. When the paper of the scanned original is smaller than A4 sized paper, for example, when the scanned original is on A5 sized paper, the scanned original can be rotated 90 degrees, and can be transmitted as an image having a width of that of a piece of A4 sized paper in the first scan direction, and the receiving device can output the received image as an image having a size of A5 sized paper. When the scanned original is B5 sized paper, the scanned original image can be rotated by 90 degrees, and can be transmitted as an image of B4 width in the first scan direction, and the receiving device can output the received image as an image having a size of B5 sized paper. Further, in the case of the image being on B4 or A3 sized paper, even when the rotational transmission is set, the image is not rotated and transmitted in the scanned direction.

Figure 4:
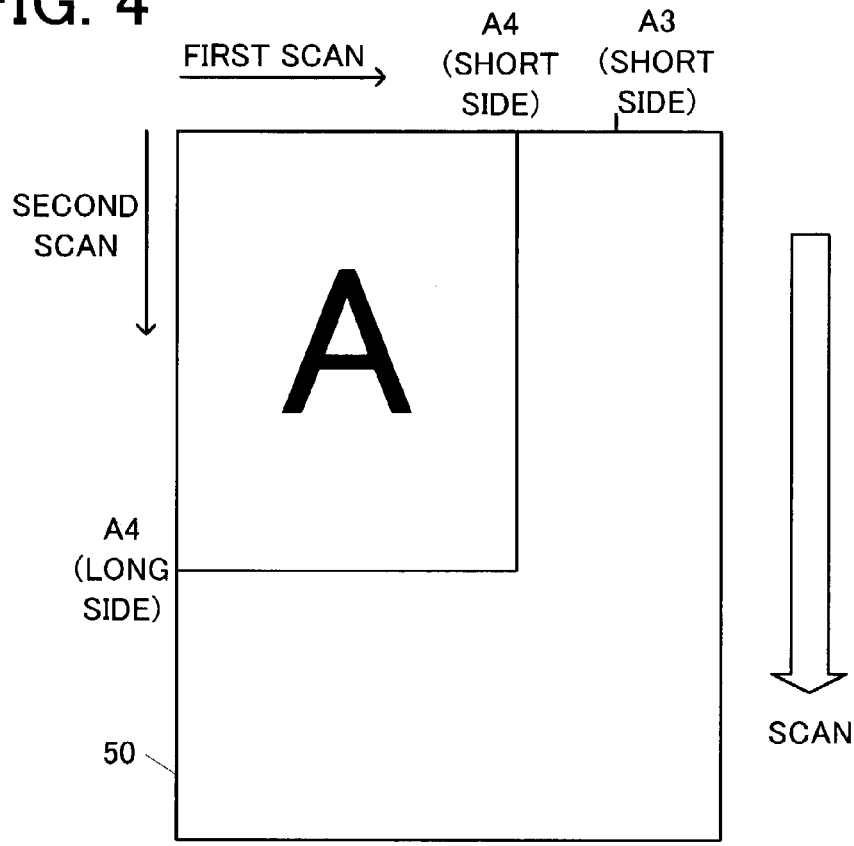
FIG. 4 illustrates original image and output image of when transmitting scanned image by an electronic mail.
Figure 4:
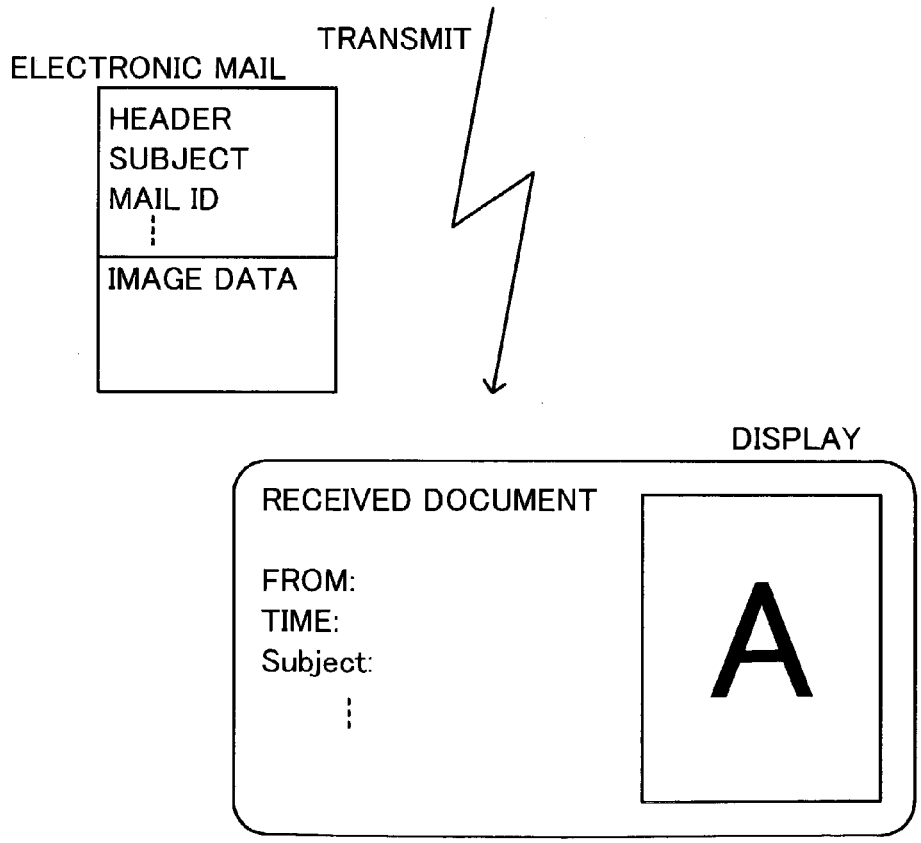

FIG. 4 shows an example of scanning of the original image at the Internet facsimile machine 1, and outputting the image at a receiving device when transmitting the scanned image by an electronic mail. The receiving device is, for example, the communication terminal 12 which is connected to the Internet 11 in FIG. 1. When scanning the original document, the A4 sized document is placed on the platen glass 50 such that the short side faces the first scan direction. Even in the case the rotational transmission of the scanned image is set, when transmitting the image data under the electronic mail format, the Internet facsimile machine 1 does not execute a rotational processing of the scanned image, and transmits the scanned image by applying a header to an electronic mail. The recipient can display the image data of the received electronic mail on the display or the like, or can print out the image data. At this time, the original image is not rotated, and the image data facing the same direction as the original document can be obtained.

Figure 5:
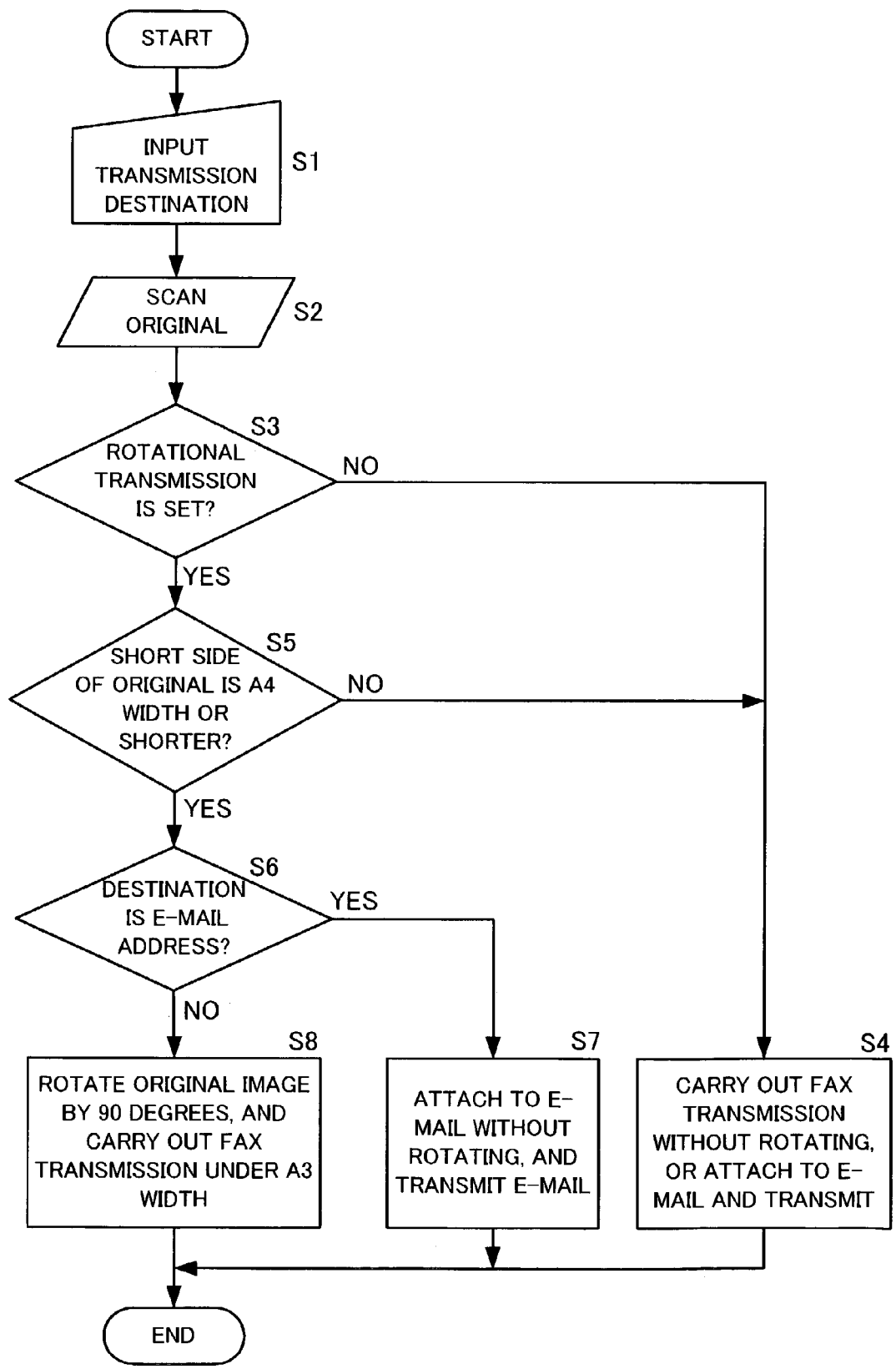
FIG. 5 is a flowchart showing an operation of the embodiment.

An operation of the embodiment will be described with reference to FIG. 5. The user inputs the electronic mail address or the facsimile number of the receiving device of the scanned document from the operation unit of the Internet facsimile machine (step 1). Then, the original image is scanned by the scanning unit (step 2). The scanned image data is stored into the ROM or the like. The paper size is detected at scanning or when the document is set by the scanning unit. When the rotational transmission is not set (step 3), the scanned image data is transmitted by facsimile without being rotated. Alternatively, when the electronic mail address is input as the destination, the image data is attached to the electronic mail, and transmitted as it is (step 4).

Next, it is determined whether the size of the original document in the first scan direction is the width of the short side of the A4 size paper or smaller (step 5). In the case the paper is A4 sized or smaller, and the paper is set such that the short side is scanned in the first scan direction, and the rotation transmission can be carried out. When the paper is a size exceeding the short side of the A4 sized paper, the image is transmitted without being rotated (step 4).

When the electronic mail address is input, and transmitting the image by the electronic mail (step 6), regardless of the setting of the rotational transmission, the scanned image is attached to the header or the like of the electronic mail, and transmitted without being rotated (step 7). When the facsimile number is input, the original image is rotated by 90 degrees, and the image is transmitted by the facsimile. At this time, if the original image is rotated by 90 degrees, the image is transmitted by the facsimile as a landscape image which the long side of A4 sized paper is output in a width (short side) direction of A3 sized paper.

According to the present embodiment, even in the case of the Internet facsimile machine which is set to transmit the original by rotating by 90 degrees, it is distinguished by whether the transmission is the facsimile transmission or the electronic mail transmission. When transmitting by the electronic mail, the scanned image is transmitted without being rotated. As a result, in the case of the facsimile transmission, the communication time or the communication expense can be saved, and in the case of the electronic mail, the recipient of the electronic mail can receive the original under an easily viewable form.

What is claimed is:

1. A facsimile machine comprising:
   a facsimile communication unit;
   an Internet facsimile communication unit; and
   a controller that sets to rotate a scanned image by 90 degrees;
   wherein when the controller sets to rotate the scanned image by 90 degrees, the facsimile communication unit rotates the scanned image by 90 degrees and transmits the scanned image, and
   wherein when the controller sets to rotate the scanned image by 90 degrees, the Internet facsimile communication unit transmits the scanned image which is not rotated by 90 degrees.

2. The facsimile machine according to claim 1, wherein when a short side of a document on which the scanned image appears is in a first scan direction, the facsimile communication unit rotates the scanned image by 90 degrees.

3. The facsimile machine according to claim 2, further comprising a document size detecting unit that detects the document size.

4. The facsimile machine according to claim 1, further comprising an image scanning unit.

5. The facsimile machine according to claim 1, wherein the facsimile machine is connected to a G3 facsimile machine via a public switched telephone network.

6. The facsimile machine according to claim 5, further comprising a network control unit that establishes a connection to the public switched telephone network.

7. The facsimile machine according to claim 1, wherein the facsimile machine is connected to the Internet via a router.

8. The facsimile machine according to claim 7, wherein the facsimile machine carries out a communication in electronic mail format.

9. The facsimile machine according to claim 1, further comprising a printing unit that prints the scanned image.

10. A transmission method of a scanned image in a facsimile machine comprising:
accepting a setting to rotate a scanned image by 90 degrees and to transmit the scanned image;
rotating the scanned image by 90 degrees and transmitting the scanned image when a short side of a document on which the scanned image appear is in a first scan direction in case of a facsimile transmission; and
transmitting the scanned image which is not rotated, in case of the Internet facsimile transmission when the setting to rotate the scanned image is accepted.

11. The method according to claim 10, further comprising, rotating the scanned image by 90 degrees by the facsimile transmission when a short side of a document on which the scanned image appears is in a first scan directions.

12. The method according to claim 10, further comprising scanning the image.

13. The method according to claim 10, further comprising connecting the facsimile machine to a public switched telephone network.

14. The method according to claim 10, further comprising detecting a size of the document.

15. A facsimile machine comprising:
means for communicating by facsimile transmission;
means for communicating by Internet facsimile transmission;
means for setting to rotate a scanned image by 90 degrees;
wherein when the means for setting to rotate the scanned image by 90 degrees sets to rotate the scanned image, the means for communicating by facsimile transmission rotates the scanned image by 90 degrees and transmits the scanned image, and
wherein when the means for setting to rotate the scanned image by 90 degrees sets to rotate the scanned image, the means for communicating by Internet facsimile transmission transmits the scanned image which is not rotated by 90 degrees.

16. The facsimile machine according to claim 15, wherein when a short side of a document on which the scanned image appears is in a first scan direction, the means for communicating by facsimile rotates the scanned image by 90 degrees.

17. The facsimile machine according to claim 16, further comprising means for detecting the document size.

18. The facsimile machine according to claim 15, further comprising means for scanning an image.

19. The facsimile machine according to claim 15, further comprising means for connecting the facsimile machine to a public switched telephone network.

20. The facsimile machine according to claim 15, further comprising means for printing the scanned image.

* * * * *